US008279601B2

(12) United States Patent
Lima et al.

(10) Patent No.: US 8,279,601 B2
(45) Date of Patent: Oct. 2, 2012

(54) AIR FLOW DUCTS FOR COOLING ELECTRONIC DEVICES WITHIN A DATA PROCESSING UNIT

(75) Inventors: David J. Lima, Los Altos, CA (US); John Kull, Emerald Hills, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 102 days.

(21) Appl. No.: 12/695,509

(22) Filed: Jan. 28, 2010

(65) Prior Publication Data

US 2011/0182027 A1 Jul. 28, 2011

(51) Int. Cl.
H05K 7/20 (2006.01)
(52) U.S. Cl. ............... 361/694; 361/695; 361/719
(58) Field of Classification Search .......... 361/695
See application file for complete search history.

(56) References Cited

U.S. PATENT DOCUMENTS

| 3,895,215 | A |   | 7/1975  | Gordon |
| 4,133,022 | A |   | 1/1979  | Moore et al. |
| 5,077,638 | A |   | 12/1991 | Andersson et al. |
| 5,477,416 | A |   | 12/1995 | Schkrohowsky et al. |
| 5,663,868 | A |   | 9/1997  | Stalley |
| 5,751,549 | A |   | 5/1998  | Eberhardt et al. |
| 5,912,801 | A |   | 6/1999  | Roy et al. |
| 6,130,819 | A | * | 10/2000 | Lofland et al. ........... 361/695 |
| 6,163,453 | A | * | 12/2000 | Hou et al. ........... 361/679.48 |
| 6,163,454 | A |   | 12/2000 | Strickler |
| 6,280,318 | B1 |  | 8/2001  | Criss-Puszkiewicz et al. |
| 6,312,287 | B1 |  | 11/2001 | Harting et al. |
| 6,400,568 | B1 | * | 6/2002  | Kim et al. ........... 361/697 |
| 6,449,150 | B1 |  | 9/2002  | Boone |
| 6,452,797 | B1 |  | 9/2002  | Konstad |
| 6,462,948 | B1 |  | 10/2002 | Leija et al. |
| 6,603,662 | B1 |  | 8/2003  | Ganrot |
| 6,628,520 | B2 |  | 9/2003  | Patel et al. |
| 6,721,180 | B2 |  | 4/2004  | Le et al. |
| 6,755,242 | B2 |  | 6/2004  | White |
| 6,768,640 | B2 |  | 7/2004  | Doblar et al. |
| 6,778,386 | B2 |  | 8/2004  | Garnett et al. |
| 6,860,649 | B2 |  | 3/2005  | Edwards et al. |
| 6,876,549 | B2 |  | 4/2005  | Beitelmal et al. |
| 6,879,486 | B1 |  | 4/2005  | Banton et al. |
| 6,900,387 | B2 |  | 5/2005  | Gravell et al. |
| 6,904,968 | B2 |  | 6/2005  | Beitelmal et al. |

(Continued)

OTHER PUBLICATIONS

Gunes Aybay et al. "Cooling System for a Data Processing Unit" U.S. Appl. No. 12/341,580, filed Dec. 22, 2008, 44 pages.

(Continued)

*Primary Examiner* — Gregory Thompson
(74) *Attorney, Agent, or Firm* — Cooley LLP

(57) ABSTRACT

Air flow ducts for improving the air flow within data processing units are described herein. In some embodiments, a duct includes an inlet portion and an outlet portion. An interior surface of the outlet portion of the duct defines, at least in part, a portion of a flow path. The duct is configured to be coupled to a printed circuit board within a data processing unit such that a first portion of a cooling fluid can flow within the flow path between the inlet portion of the duct and an electronic device coupled to the printed circuit board. An exterior surface of the outlet portion of the duct is configured to redirect a second portion of the cooling fluid to a volume within the data processing unit apart from the electronic device.

20 Claims, 10 Drawing Sheets

U.S. PATENT DOCUMENTS

| | | | |
|---|---|---|---|
| 6,912,131 B2 | 6/2005 | Kabat | |
| 6,989,988 B2 * | 1/2006 | Arbogast et al. | 361/695 |
| 6,999,312 B1 * | 2/2006 | Garnett et al. | 361/679.54 |
| 7,074,123 B2 | 7/2006 | Bettridge | |
| 7,079,388 B2 * | 7/2006 | Faneuf et al. | 361/679.51 |
| 7,088,583 B2 | 8/2006 | Brandon et al. | |
| 7,112,131 B2 | 9/2006 | Rasmussen et al. | |
| 7,120,018 B2 * | 10/2006 | Shen et al. | 361/695 |
| 7,154,748 B2 | 12/2006 | Yamada | |
| 7,158,379 B2 | 1/2007 | Sanders et al. | |
| 7,164,581 B2 | 1/2007 | Carullo et al. | |
| 7,209,351 B2 | 4/2007 | Wei | |
| 7,245,632 B2 | 7/2007 | Heffernan et al. | |
| 7,248,472 B2 * | 7/2007 | Vinson et al. | 361/694 |
| 7,256,995 B2 | 8/2007 | Wrycraft et al. | |
| 7,382,613 B2 * | 6/2008 | Vinson et al. | 361/679.48 |
| 7,403,388 B2 * | 7/2008 | Chang | 361/695 |
| 7,420,806 B1 | 9/2008 | Lima et al. | |
| 7,434,412 B1 | 10/2008 | Miyahira | |
| 7,548,421 B2 | 6/2009 | Malone et al. | |
| 7,573,712 B2 * | 8/2009 | Wu et al. | 361/695 |
| 7,722,359 B1 | 5/2010 | Frangioso et al. | |
| 7,804,684 B1 | 9/2010 | Aybay et al. | |
| 7,808,792 B2 | 10/2010 | Nguyen | |
| 7,813,120 B2 | 10/2010 | Vinson et al. | |
| 7,826,222 B2 | 11/2010 | Aybay et al. | |
| 7,885,066 B2 | 2/2011 | Boyden et al. | |
| 7,916,472 B1 | 3/2011 | Aybay et al. | |
| 7,990,706 B2 * | 8/2011 | Miyahara et al. | 361/695 |
| 2002/0018339 A1 | 2/2002 | Uzuka et al. | |
| 2002/0126449 A1 | 9/2002 | Casebolt | |
| 2004/0001311 A1 | 1/2004 | Doblar et al. | |
| 2004/0130868 A1 | 7/2004 | Schwartz et al. | |
| 2004/0264145 A1 | 12/2004 | Miller et al. | |
| 2005/0180103 A1 | 8/2005 | Ku | |
| 2005/0207134 A1 | 9/2005 | Belady et al. | |
| 2005/0281005 A1 | 12/2005 | Carullo et al. | |
| 2006/0002084 A1 | 1/2006 | Wei | |
| 2006/0126292 A1 | 6/2006 | Pfahnl et al. | |
| 2006/0181846 A1 * | 8/2006 | Farnsworth et al. | 361/695 |
| 2007/0223199 A1 | 9/2007 | Fujiya et al. | |
| 2008/0225479 A1 | 9/2008 | Zieman et al. | |
| 2009/0059520 A1 | 3/2009 | Tanaka et al. | |
| 2009/0109612 A1 | 4/2009 | Moss et al. | |
| 2009/0122484 A1 | 5/2009 | Caveney | |
| 2009/0296352 A1 | 12/2009 | Lima | |
| 2010/0014248 A1 | 1/2010 | Boyden et al. | |
| 2011/0011562 A1 | 1/2011 | Aybay et al. | |
| 2011/0011567 A1 | 1/2011 | Aybay et al. | |
| 2011/0056660 A1 | 3/2011 | Aybay et al. | |

OTHER PUBLICATIONS

SERVO, "Brushless DC Fans & Blowers, PUDC series 80 × 25 mm" Product Brochure, www.nidec-servo.com 2008/2009, 4 pages.

EBMPAPST, "3000 Series, Tubeaxial, 92×92×38 mm" Product Brochure, ebm-papst Inc., 2006, p. 134.

Delta, "FFB 60×60×38 MM Series" Product Brochure, [online], [retrieved on Jun. 15, 2009] Retrieved from the Internet: <URL: http://www.deltaww.com>, p. 55.

Programmable Logic DesignLine "How to effectively use fan trays in electronic systems"[online], [retrieved on Sep. 17, 2009]Retrieved from the Internet: <URL: http://www.pldesignline.com/219500379;jsessionid>, 5 pages.

Bob Schluter "Controlling the Temperature Inside Equipment Racks" © 2002-2004 Middle Atlantic Products, Inc., 48 pages.

Office Action mailed Mar. 14, 2012 for U.S. Appl. No. 12/566,425 (11 pages).

* cited by examiner

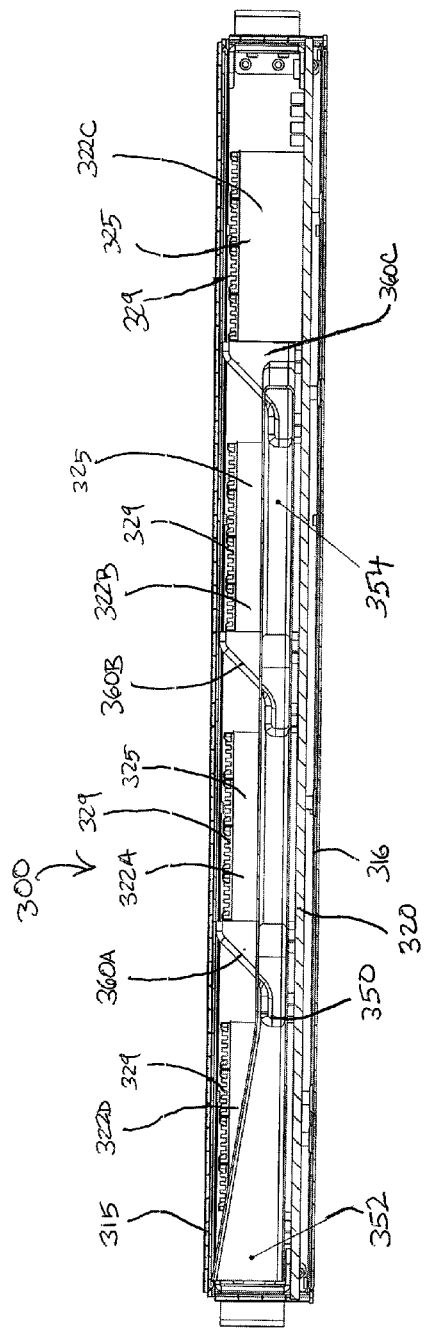
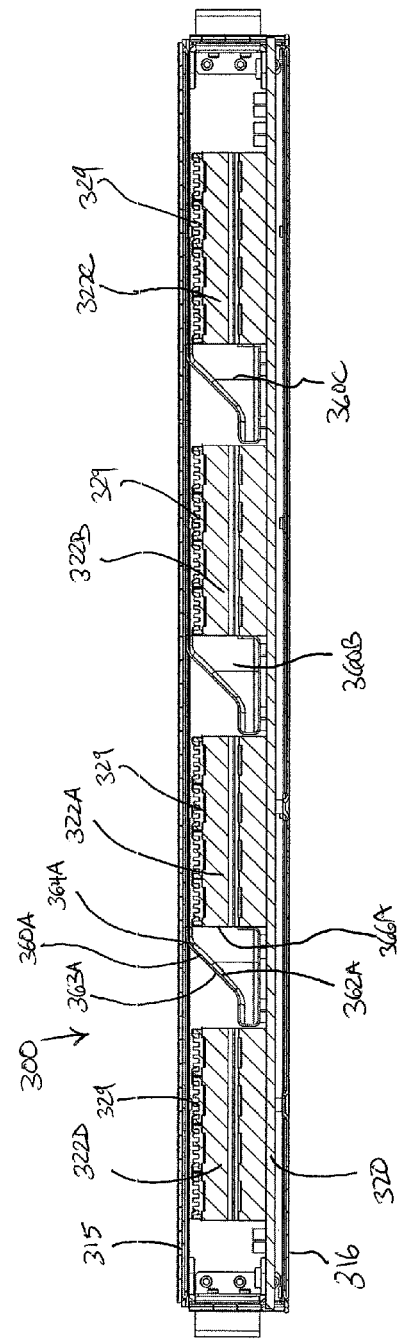
FIG. 16
FIG. 17

AIR FLOW DUCTS FOR COOLING ELECTRONIC DEVICES WITHIN A DATA PROCESSING UNIT

BACKGROUND

The embodiments described herein relate to apparatus and methods for cooling electronic devices, including, for example, air flow ducts for directing cooling air flow to and/or away from an electronic device.

Data processing units, such as routers, switches, servers, storage devices, and/or components included within a core switch fabric of a data center, include electronic devices (e.g., amplifiers, signal processors, optical transceivers or the like) that generate heat during their operation. To increase the processing speed and/or processing capacity, some known data processing units include high power electronic devices, more densely-packaged electronic devices and/or the like. Accordingly, some known data processing units include forced air cooling systems to prevent overheating of the electronic devices contained within the known data processing unit.

Some known cooling systems are configured to convey cooling air across the surface of a circuit board via a cooling flow path that extends from a first side the circuit board to a second side of the circuit board. In such arrangements, however, the electronic devices disposed on or adjacent the second side of the circuit board are exposed to cooling air that has been heated as a result of flowing across the electronic devices disposed on or adjacent the first side of the circuit board. Similarly stated, with such cooling systems, the electronic devices located downstream receive cooling air having a higher temperature than that of the cooling air received by the electronic devices located upstream. Moreover, such known cooling systems do not allow the cooling air to be selectively directed toward or away from certain electronic devices (e.g., electronic devices that are more thermally-sensitive devices, electronic devices having high power consumption or the like).

Thus, a need exists for improved apparatus and methods for cooling air flow within data processing units.

SUMMARY

Air flow ducts for improving the air flow within data processing units are described herein. In some embodiments, a duct includes an inlet portion and an outlet portion. An interior surface of the outlet portion of the duct defines, at least in part, a portion of a flow path. The duct is configured to be coupled to a printed circuit board within a data processing unit such that a first portion of a cooling fluid can flow within the flow path between the inlet portion of the duct and an electronic device coupled to the printed circuit board. An exterior surface of the outlet portion of the duct is configured to redirect a second portion of the cooling fluid to a volume within the data processing unit apart from the electronic device.

BRIEF DESCRIPTION OF THE DRAWINGS

FIG. 16 is a cross-sectional view of the portion of the data processing unit shown in FIGS. 3 and 4, taken along line $X_7$-$X_7$ in FIG. 5.

FIG. 17 is a cross-sectional view of the portion of the data processing unit shown in FIGS. 3 and 4, taken along line $X_8$-$X_8$ in FIG. 5.

DETAILED DESCRIPTION

Figure 1:
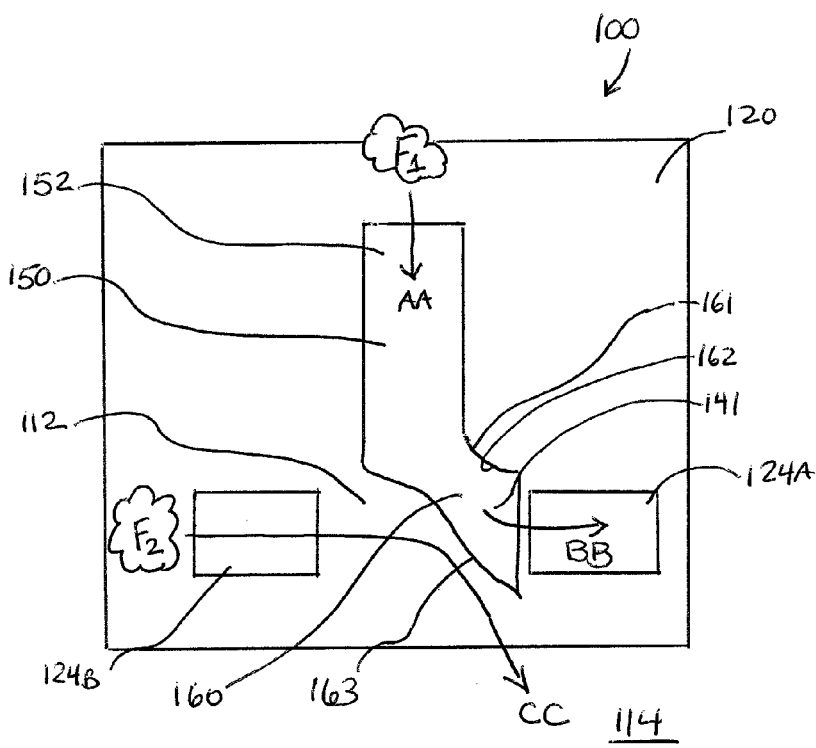
FIG. 1 is a schematic illustration of a portion of a data processing unit including a duct according to an embodiment.

Air flow ducts for improving the air flow within data processing units are described herein. In some embodiments, a duct includes an inlet portion and an outlet portion. An interior surface of the outlet portion of the duct defines, at least in part, a portion of a flow path. The duct is configured to be coupled to a printed circuit board within a data processing unit such that a first portion of a cooling fluid can flow within the flow path between the inlet portion of the duct and an electronic device coupled to the printed circuit board. An exterior surface of the outlet portion of the duct is configured to redirect a second portion of the cooling fluid to a volume within the data processing unit apart from the electronic device.

In some embodiments, a duct includes an inlet portion, a first outlet portion and a second outlet portion. The first outlet portion defines, at least in part, a portion of a first flow path. The second outlet portion has an exterior surface and an interior portion. The exterior surface of the second outlet portion of the duct defines, at least in part, a portion of the first flow path. The interior surface of the second outlet portion of the duct defines, at least in part, a portion of a second flow path. The duct is configured to be coupled to a printed circuit board such that a first electronic device coupled to the printed circuit board is within the first flow path, and a second electronic device coupled to the printed circuit board is within the second flow path. The first electronic device and the second electronic device can be, for example, removable optical transceivers. The duct is configured such that a first portion of a cooling fluid can flow within the first flow path between the first electronic device and a volume within the data processing unit apart from the second electronic device. The duct is configured such that a second portion of the cooling fluid can flow within the second flow path between the inlet portion of the duct and the second electronic device.

In some embodiments, a duct defines, at least in part, a portion of a first inlet flow path, a portion of a second inlet flow path, and a portion of an exhaust flow path. The duct is configured to be coupled to a printed circuit board within a data processing unit such that a first portion of a cooling fluid can flow within the first inlet flow path from a source of cooling fluid to a first electronic device. A second portion of the cooling fluid can flow within the second inlet flow path from the source of cooling fluid to a second electronic device. The first portion of the cooling fluid can flow within the exhaust flow path from the first electronic device to a volume within the data processing unit apart from the second electronic device.

As used herein the term "data processing unit" refers to, for example, any computer, electronic switch, switch fabric, portion of a switch fabric, router, host device, data storage device, line card or the like used to process, transmit and/or convey electrical and/or optical signals. A data processing unit can include, for example, a component included within an electronic communications network. In some embodiments, for example, a data processing unit can be a component included within or forming a portion of a core switch fabric of a data center. In other embodiments, a data processing unit can be an access switch located at an edge of a data center, or a host or peripheral device (e.g., a server) coupled to the access device. For example, an access switch can be located on top of a chassis containing several host devices.

As used herein the term "electronic device" refers to any component within a data processing unit that is configured to perform an electronic function associated with the data processing unit. An electronic device can include, for example, a switching device, a converter, a receiver, a transmitter, a transceiver, a signal conditioner, an amplifier and/or the like. In some embodiments, an electronic device can include an optical transceiver configured to convert electrical signals into optical signals and vice versa.

FIG. 1 is a schematic illustration of a portion of a data processing unit 100 according to an embodiment. The data processing unit 100 includes a chassis (not shown), a printed circuit board 120, two electronic devices 124A, 124B and a duct 150. The chassis or frame defines an internal and/or enclosed volume that contains the printed circuit board 120, electronic devices 124A, 124B, the duct 150 and any additional components associated with the operation of the data processing unit 100 (e.g., cooling fans, power supplies, data transmission cables and/or the like). More particularly, the data processing unit 100 and/or the chassis defines a volume 112 within which the electronic devices 124A, 124B are disposed and a volume 114 that is spaced apart from the volume 112. The volume 114 can include other components of the data processing unit 100, such as, for example, other electronic devices (e.g., devices having a different power consumption and/or temperature sensitivity that the electronic devices 124A, 124B), fans, power supplies and/or the like. The volume 112 and the volume 114 need not be separated by a distinct wall, baffle or structure, but can be defined by the placement of the components therein. By segregating the electronic devices 124A, 124B within the volume 112, an amount of cooling air flow within the volume 112 can be provided to accommodate thermal load and/or thermal sensitivity of the electronic devices 124A, 124B.

The printed circuit board 120 can be any suitable structure that can operatively couple the electronic devices 124A, 124B to each other and/or to other components within the data processing unit 100. In this manner, the printed circuit board 120, the electronic devices 124A, 124B and other electronic components (e.g., modules, connectors, and the like, which are not shown in FIG. 1) can collectively perform, at least in part, the functions of the data processing unit 100. In some embodiments, for example, the printed circuit board 120 can be a substantially rigid structure that includes a series of conductive layers surrounded by and/or separated by an insulating material.

The electronic devices 124A, 124B are coupled to the printed circuit board 120. In some embodiments, the electronic devices 124A, 124B can be removably coupled to the printed circuit board 120. In some embodiments, for example, the electronic devices 122A, 122B can be pluggable optical transceivers. More particularly, the electronic devices 122A, 122B can be pluggable optical transceivers manufactured according to the SFP standard or any other Multi-Source Agreement (MSA) standard, including, for example, the Quad Small Form Factor Pluggable (QSFP) standard, the CXP standard, the XFP standard, or the like.

The duct 150 includes an inlet portion 152 and an outlet portion 160. The inlet portion 152 of the duct 150 receives a first portion $F_1$ of a cooling fluid, as shown by the arrow AA in FIG. 1. The inlet portion 152 can include, for example, one or more openings through which the first portion $F_1$ of a cooling fluid can enter the duct 150. The cooling fluid can be any suitable cooling fluid (e.g., air, nitrogen, or the like) used to cool the components within the data processing unit 100.

The outlet portion 160 of the duct 150 includes a side wall 161 having an interior (or inner) surface 162 and an exterior (or outer) surface 163. The interior surface 162 defines, at least in part, a portion of a flow path 141. The duct 150 is coupled to the printed circuit board 120 such that the first portion $F_1$ of the cooling fluid flows within the flow path 141 between the inlet portion 152 of the duct 150 and the electronic device 124A, as shown by the arrow BB in FIG. 1. Said another way, the duct 150 is coupled to the printed circuit board 120 such that the first portion $F_1$ of the cooling fluid flows within the flow path 141 between the inlet portion 152 of the duct 150 and the volume 112 defined by the data processing unit 100 that includes the electronic device 124A. Similarly stated, the first portion $F_1$ of the cooling fluid can be conveyed within the flow path 141 from the inlet portion 152 of the duct 150 to the electronic device 124A. In this manner, the first portion $F_1$ of the cooling fluid flow can be directed to the electronic device 124A via the duct 150 and/or the flow path 141.

The exterior surface 163 of the outlet portion 160 is configured to redirect a second portion $F_2$ of the cooling fluid to the volume 114 spaced apart from the electronic devices 124A, 124B as shown by the arrow CC in FIG. 1. Similarly stated, the exterior surface 163 of the outlet portion 160 has a shape and/or orientation configured to change the flow direction of the second portion $F_2$ of the cooling fluid when the second portion $F_2$ of the cooling fluid flows against and/or adjacent to the outlet portion 160 of the duct 150. More particularly, the exterior surface 163 of the outlet portion 160 is shaped and/or oriented to change the flow direction of the second portion $F_2$ of the cooling fluid from a first direction that would otherwise result in the second portion $F_2$ of the cooling fluid flowing into the volume 112 and/or across the electronic device 124A to a second direction in which the second portion $F_2$ of the cooling fluid flows away from the volume 112 (e.g., into the volume 114) and/or away from the electronic device 124A. In this manner, the duct 150 can define at least in part, a portion of a first flow path (e.g., the flow path 141) within which the first portion $F_1$ of the cooling fluid can flow into the volume 112 and/or across the electronic device 124A, and can also redirect the second portion $F_2$ of the cooling fluid away from the volume 112 and/or the electronic device 124A.

This arrangement can be used, for example, to provide a low temperature, inlet cooling fluid to the electronic device 124A while also redirecting a higher temperature, exhaust fluid produced by cooling the electronic device 124B away from the electronic device 124A. For example, as shown in FIG. 1, in some embodiments, the second portion $F_2$ of the cooling fluid can flow across, against and/or adjacent the electronic device 124B before flowing across, against and/or contacting the outlet portion 160 of the duct 150. Thus, when the second portion $F_2$ of the cooling fluid flows across, against and/or adjacent to the outlet portion 160 of the duct 150, it is an exhaust flow having a higher temperature (as a result of cooling the electronic device 124B) than the first portion $F_1$ of the cooling fluid flowing within the duct 150. In this manner, the first portion $F_1$ of the cooling fluid, which is used to cool the electronic device 124A, is not heated by and/or mixed with the second portion $F_2$ of the cooling fluid that is first used to cool the electronic device 124B. Thus, the uniformity, efficiency and/or effectiveness of a cooling system containing the duct 150 can be improved as compared to cooling systems in which the air flows across the electronic devices 124A, 124B in series.

Although the flow path 141 is shown as being defined substantially entirely by the internal surface 162 of the outlet portion 160 of the duct 150, in other embodiments, a duct and/or a portion of a duct can define only a portion of a flow path. For example, in some embodiments, a first portion of a flow path can be defined by a duct (similar to the duct 150) and a second portion of the flow path can be defined by another structure (e.g., the chassis). In other embodiments, a portion of a flow path can be collectively defined by a duct (similar to the duct 150) and another structure (e.g., the printed circuit board 120).

Figure 2:
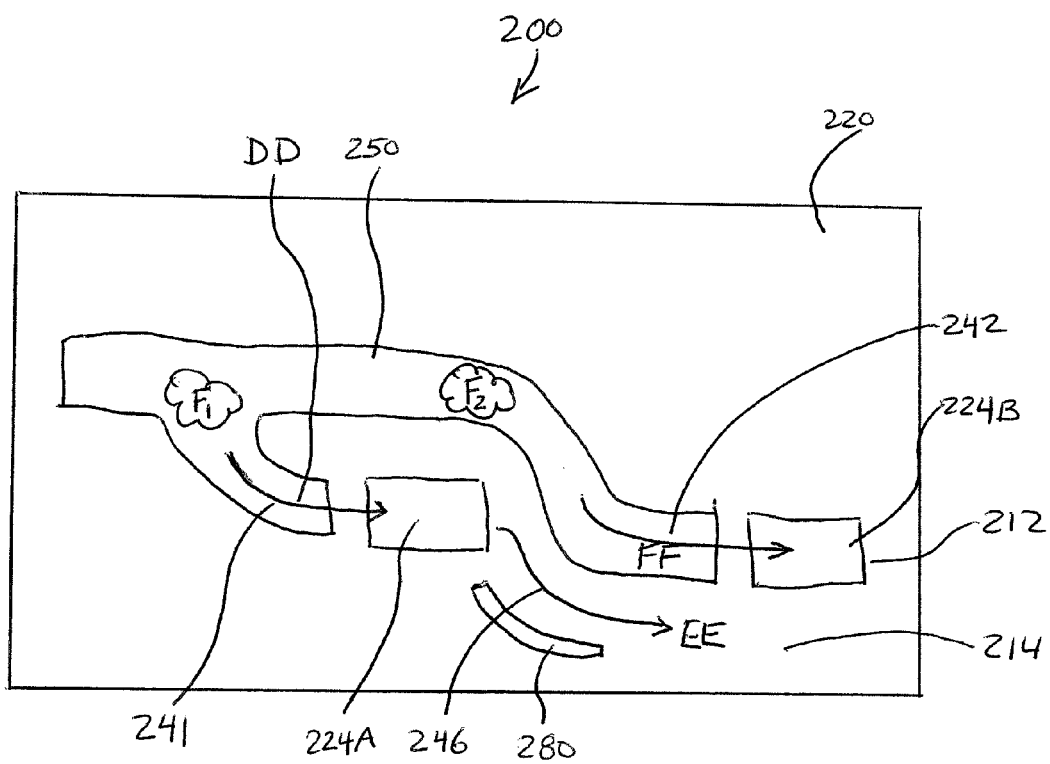
FIG. 2. is a schematic illustration of portion of a data processing unit according to an embodiment that defines multiple flow paths.

Although the exterior surface 163 of the outlet portion 160 is shown and described above as redirecting the second portion $F_2$ of the cooling fluid to the volume 114 spaced apart from the electronic devices 124A, 124B, in other embodiments, a portion of the duct 150 and/or the exterior surface 163 can define, at least in part a portion of a flow path. For example, FIG. 2 is a schematic illustration of a portion of a data processing unit 200 according to an embodiment. The data processing unit 200 includes a chassis (not shown), a printed circuit board 220, a first electronic device 224A, a second electronic device 224B, a duct 250 and a flow structure 280. The chassis or frame defines an internal and/or enclosed volume that contains the printed circuit board 220, the first electronic device 224A, the second electronic device 224B, the duct 250 and any additional components associated with the operation of the data processing unit 200 (e.g., cooling fans, power supplies, data transmission cables and/or the like). The data processing unit 200 and/or the chassis defines a volume 212 within which at least the second electronic device 224B is disposed and a volume 214 that is spaced apart from the volume 212 that contains the second electronic device 224B.

The printed circuit board 220 can be any suitable structure that can operatively couple the first electronic device 224A and the second electronic device 224B to each other and/or to other components within the data processing unit 200. The printed circuit board 200 can be, for example, similar to the printed circuit board 100 shown and described above, and is therefore not described in herein. The first electronic device 224A and the second electronic device 224B are coupled to the printed circuit board 220, and can be, for example, removable optical transceivers.

The duct 250 defines, at least in part, a portion of a first inlet flow path 241, a portion of a second inlet flow path 242 and a portion of an exhaust flow path 246. More particularly, a portion of the duct 250 and the baffle 280 collectively define the exhaust flow path 246. As shown in FIG. 2, the duct 250 is coupled to the printed circuit board 220 such that a first portion $F_1$ of a cooling fluid flows within the first inlet flow path 241 from a source of cooling fluid (not shown in FIG. 2) to the first electronic device 224A, as shown by the arrow DD in FIG. 2. The first portion $F_1$ of the cooling fluid flows the within the exhaust flow path 246 from the first electronic device 224A to the volume 214 that is spaced apart from the second electronic device 224B, as shown by the arrow EE in FIG. 2.

The duct 250 is coupled to the printed circuit board 220 such that a second portion $F_2$ of the cooling fluid flows within the second inlet flow path 242 from the source of cooling fluid (not shown in FIG. 2) to the second electronic device 224B, as shown by the arrow FF in FIG. 2. This arrangement allows the first portion $F_1$ and the second portion $F_2$ of the cooling fluid to be conveyed to the first electronic device 224A and the second electronic device 224B, respectively, in parallel. Moreover, after the first portion $F_1$ of the cooling fluid flows across the first electronic device 224A, it is directed away the second electronic device 224B. In this manner, the second portion $F_2$ of the cooling fluid, which is used to cool the second electronic device 224B, is not heated by and/or mixed with the first portion $F_1$ of the cooling fluid that is first used to cool the first electronic device 224A.

Although the exhaust flow path 246 is shown and described as being collectively defined, at least in part, by the duct 250 and the baffle 280, in other embodiments, the exhaust flow path 246 can be defined solely by the duct 250. Moreover, although the first intake flow path 241 and the second intake flow path 242 are shown in FIG. 2 as being separate and/or distinct from each other, in other embodiments, a duct can define a portion of a first intake flow path and a portion of a second intake flow path that share a common boundary.

Figure 3:
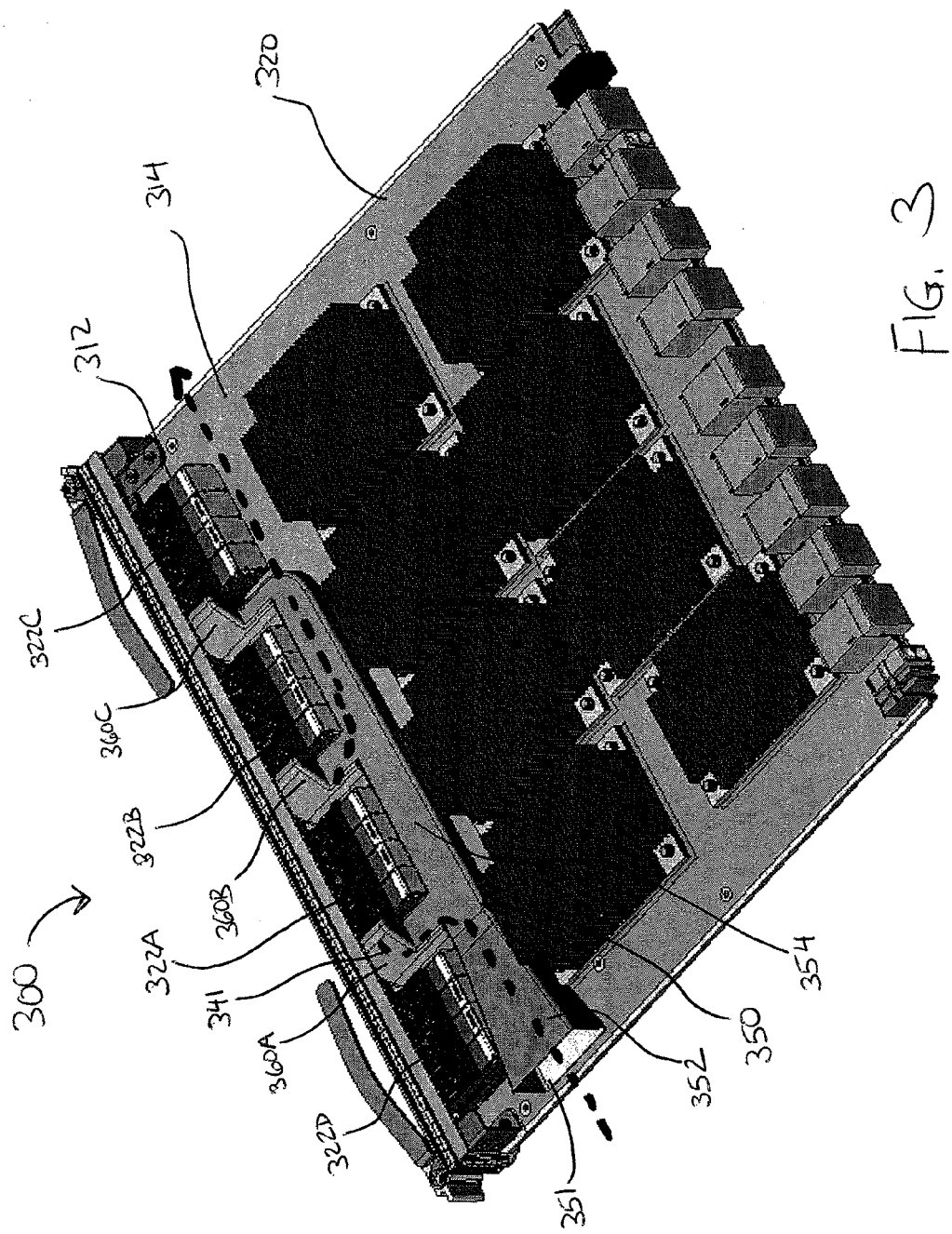
FIGS. 3 and 4 are perspective views of a portion of a data processing unit including a duct according to an embodiment.
Figure 4:
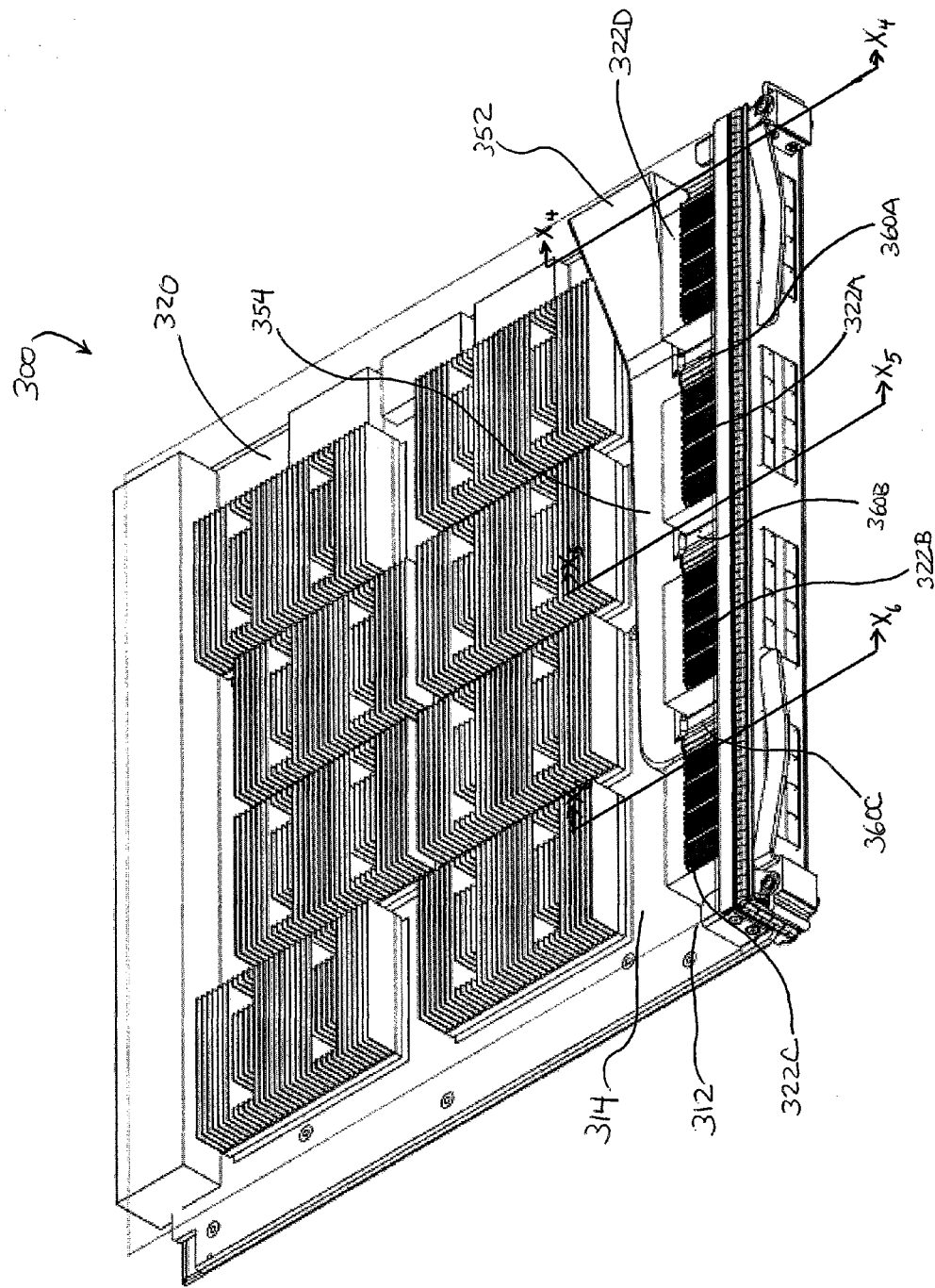
Figure 5:
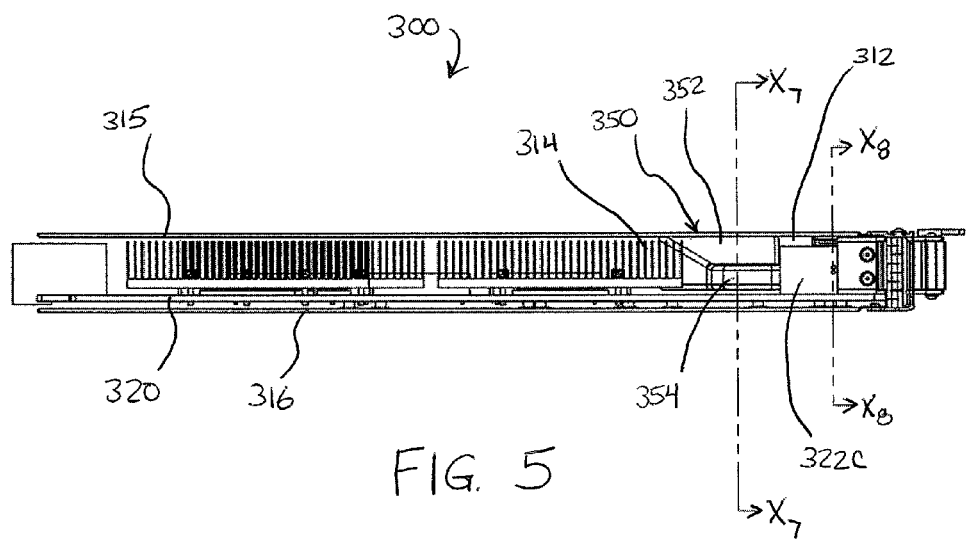
FIG. 5 is a side view of the portion of the data processing unit shown in FIGS. 3 and 4.

FIGS. 3 and 4 are perspective views of a portion of a data processing unit 300 according to an embodiment. FIG. 5 is a side view of the portion of the data processing unit 300. FIGS. 3 and 4 show the portion of the data processing unit 300 without the top cover 315 to show more clearly the components therein (the top cover 315 is shown, for example, in FIG. 5). Additionally, certain components (e.g., the connectors towards the rear of the printed circuit board 320) are shown in FIG. 4 as a schematic representations. The data processing unit 300 includes a chassis (not shown), a printed circuit board 320, a series of optical transceiver assemblies 322A, 322B, 322C and 332D and a cooling system (not identified in FIGS. 3 and 4) that includes a duct 350.

The chassis or frame defines an internal and/or enclosed volume that contains the printed circuit board 320, the optical transceiver assemblies 322A, 322B, 322C and 332D, the duct 350, at least a portion of the cooling system (e.g., cooling fans, plenums and/or the like) and any additional components associated with the operation of the data processing unit 300 (e.g., power supplies, data transmission cables and/or the like). More particularly, the data processing unit 300 and/or the chassis defines a first volume 312 within which the optical transceiver assemblies 322A, 322B, 322C and 332D are disposed and a volume 314 that is spaced apart from the volume 312. The volume 314 can include other components of the data processing unit 300, such as, for example, other electronic devices (e.g., devices having a different power consumption and/or temperature sensitivity that the optical transceivers), fans, power supplies or the like. By segregating the optical transceiver assemblies 322A, 322B, 322C and 332D within the volume 312 (i.e., outside of the volume 314), the cooling system and/or the duct 350 can provide an amount of cooling air flow within the volume 312 to accommodate the thermal load and/or thermal sensitivity of the optical transceiver assemblies 322A, 322B, 322C and 332D.

The printed circuit board 320 and the components mounted thereto can be removably mounted within a specific "bay" defined within the chassis. To facilitate this arrangement and to protect the printed circuit board 320 and the components mounted thereto, the printed circuit board 320 is substantially enclosed by a top cover 315 and a bottom cover 316, as shown in FIG. 5. Thus, the top cover 315 and/or the bottom cover 316 define, at least in part, the volume 312 and the volume 314. Moreover, as described in more detail herein, the top cover 315 defines, at least in part, a portion of the cooling flow paths within the data processing unit 300.

The printed circuit board 320 can be any suitable structure that can support and operatively couple the optical transceiver assemblies 322A, 322B, 322C and 332D to each other and/or to other components within the data processing unit 300. In this manner, the printed circuit board 320, the optical transceiver assemblies 322A, 322B, 322C and 332D and other electronic components (e.g., modules, connectors, and the like) can collectively perform, at least in part, the functions of the data processing unit 300. In some embodiments, for example, the printed circuit board 320 can be a substantially rigid structure that includes a series of conductive layers surrounded by and/or separated by an insulating material.

Figure 6:
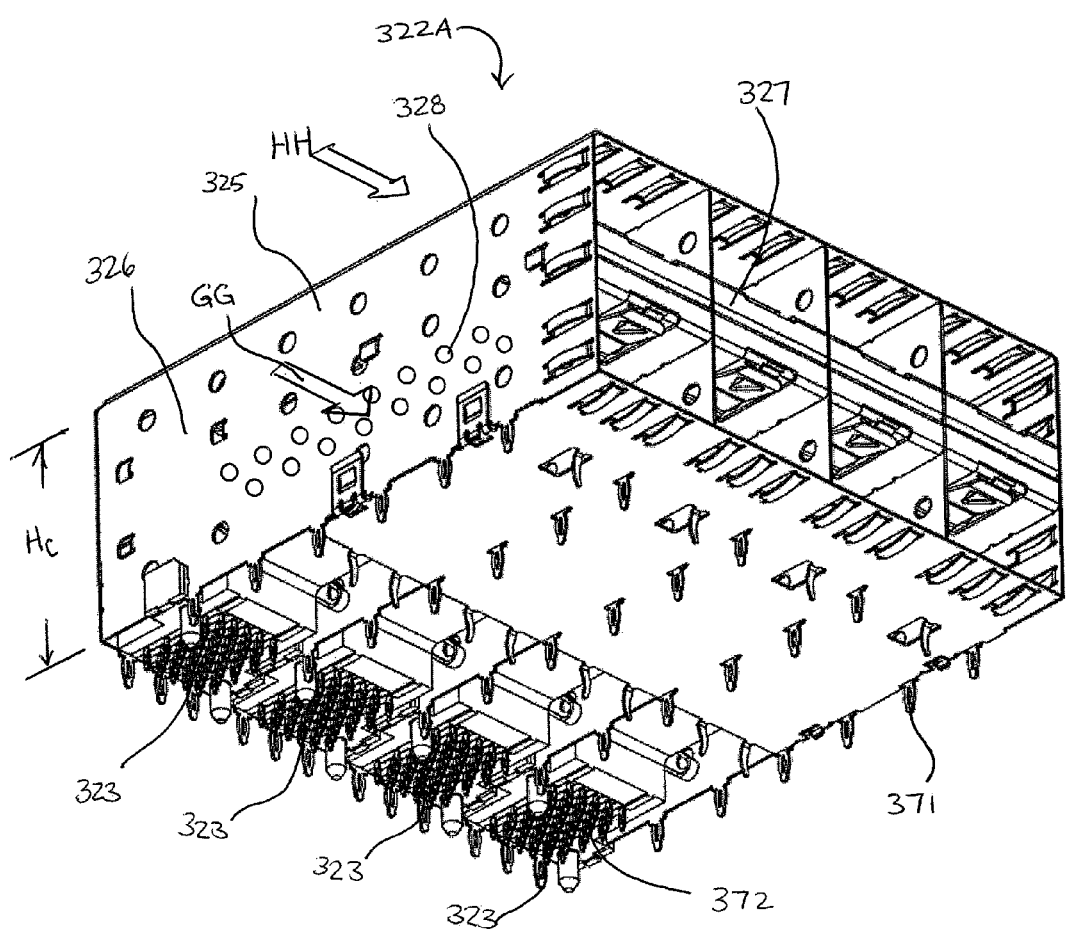
FIG. 6 is a perspective view of a portion of the electronic device assembly shown in FIGS. 3 and 4.

Each of the optical transceiver assemblies 322A, 322B, 322C and 322D includes a mounting cage 325, as shown in FIG. 6, a series of optical transceivers (not shown in FIG. 6), a series of electrical connectors 323, As shown in FIG. 6, and a series of heat sinks 329 (see e.g., FIGS. 14-17). The mounting cage 325 and the electrical connectors 323 are coupled to the printed circuit board 320 by a series of mounting protrusions 371 and connector pins 372, respectively (only one protrusion and one set of connector pins are identified for clarity). The mounting cage 325 includes a side wall 326 that defines a partitioned interior volume 327 within which a series (e.g., up to eight) of optical transceivers can be removably disposed. More particularly, the interior volume 327 is partitioned such that one optical transceiver can be mounted between another optical transceiver and the printed circuit board 320. Similarly stated, the interior volume 327 is partitioned such that optical transceivers can be removably coupled to the printed circuit board 320 in a "stacked" configuration. Accordingly, each pair of optical transceivers includes a top (or upper) optical transceiver mounted above a bottom (or lower) optical transceiver that is mounted between the top optical transceiver and the printed circuit board 320. Thus, the height $H_C$ of the mounting cage 325 is at least two times the height of an optical transceiver.

The side wall 326 of the mounting cage 325 defines a series openings 328 through which a portion of a cooling fluid can flow, as shown by the arrow GG in FIG. 6. Although not shown in FIG. 6, the side wall opposite the side wall 326 also defines a series openings through which a portion of a cooling fluid can flow (e.g., out of the interior volume 327). In this manner, the portion of the cooling fluid can flow laterally (or from one side to the other) through the bottom portion of the interior volume 327 of the mounting cage 325. Similarly stated, this arrangement facilitates the flow of cooling fluid across the top portion of the bottom optical transceivers to cool the bottom optical transceivers.

The mounting cage also defines a series of top openings (not shown in FIG. 6) within which a series of heat sinks 329 (see e.g., FIGS. 14-17) are disposed and placed into contact with each of the top optical transceivers. The heat sinks 329 can be any suitable structure that facilitates the conduction and convection of heat from the optical transceivers. For example, in some embodiments, the heat sinks 329 can be similar to the "riding heat sinks" shown and described in U.S. patent application Ser. No. 12/493,829, entitled "Heat Sinks Having a Thermal Interface for Cooling Electronic Devices," filed on Jun. 29, 2009, which is incorporated herein by reference in its entirety. Because a portion of each of the heat sinks 329 is disposed above the mounting cage 325 (see e.g. FIGS. 14-17), a portion of the cooling fluid can flow laterally (or from one side to the other) across the top portion of the mounting cage 325, as shown by the arrow HH in FIG. 6. Thus, as described in more detail herein, the cooling fluid flows in parallel across the top portion of the mounting cage 325 and through the openings 328.

Figure 7:
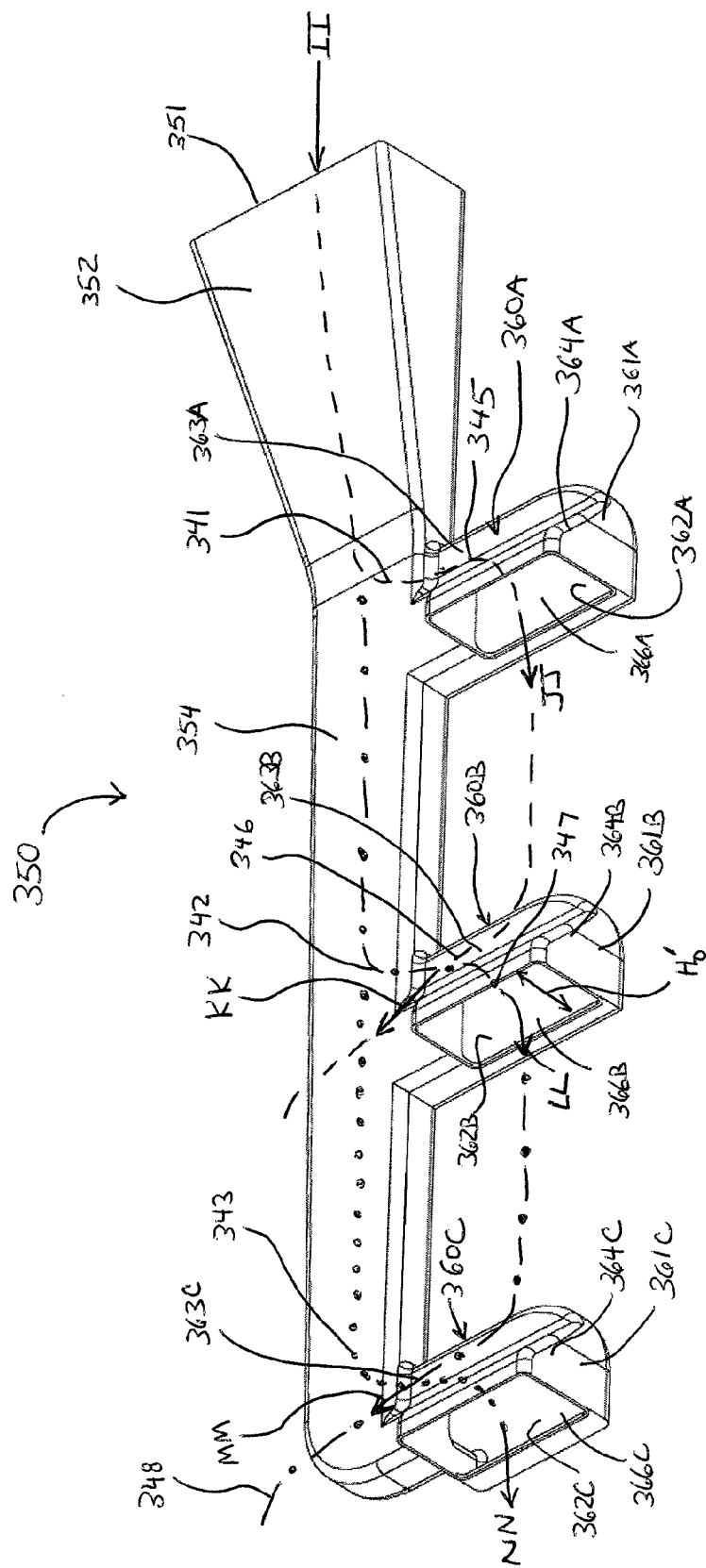
FIG. 7 is a perspective view of the duct shown in FIGS. 3 and 4.
Figure 8:
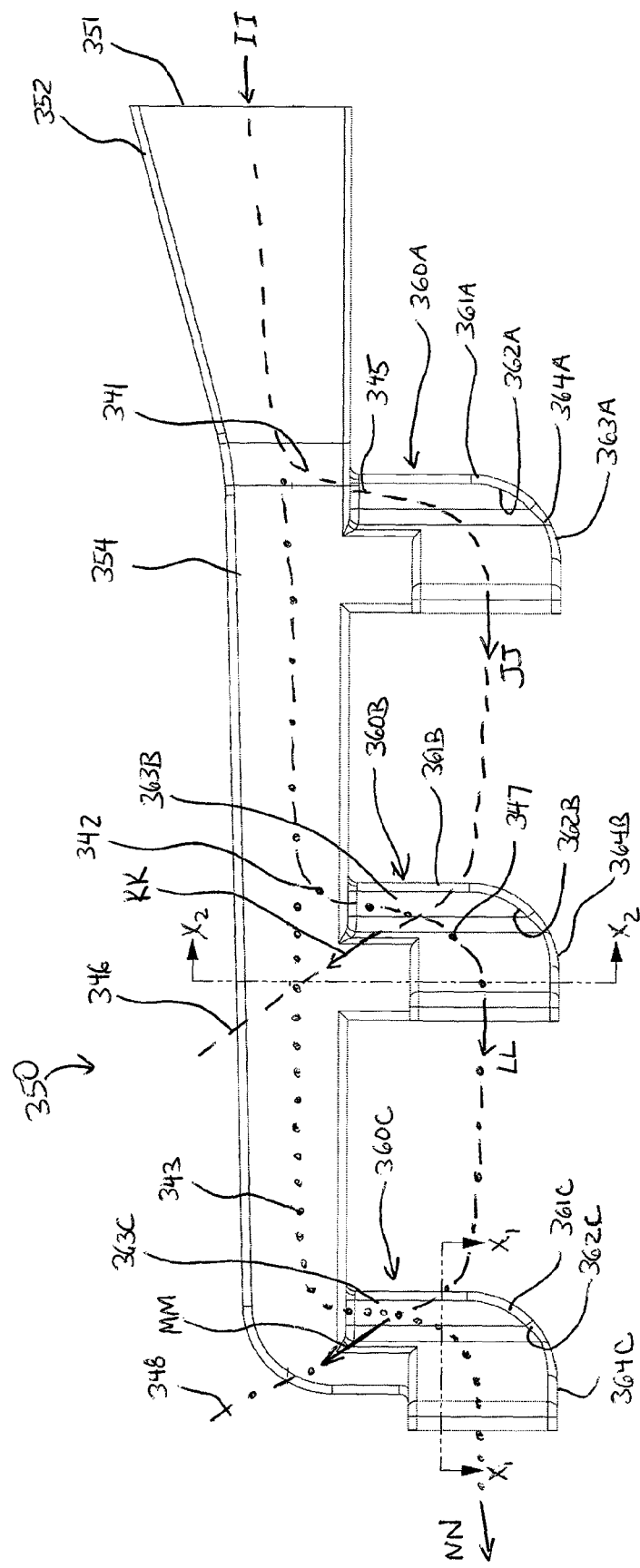
FIG. 8-10 are a top view, a front view and a side view, respectively, of the duct shown in FIGS. 3 and 4.

As shown in FIGS. 7-12, the duct 350 includes an inlet portion 352, a central portion 354 and a three outlet portions 360A, 360B, 360C. As described in more detail below, the duct 350 defines, at least in part a first flow path 341, a second flow path 342 and a third flow path 343. The first flow path 341 is shown in FIGS. 3, 7 and 8 as a dashed line. The first flow path 341 includes an inlet portion 345 (defined, at least in part, by the interior surface 362A of the outlet portion 360A) and an exhaust portion 346 (defined, at least in part, by the exterior surface 363B of the outlet portion 360B). The second flow path 342 is shown in FIGS. 7 and 8 as a dashed/dotted line. The second flow path 342 includes an inlet portion 347 (defined, at least in part, by the interior surface 362B of the outlet portion 360B) and an exhaust portion 348 (defined, at least in part, by the exterior surface 363C of the outlet portion 360C). The third flow path 343 is shown in FIGS. 7 and 8 as a dotted line.

Figure 13:
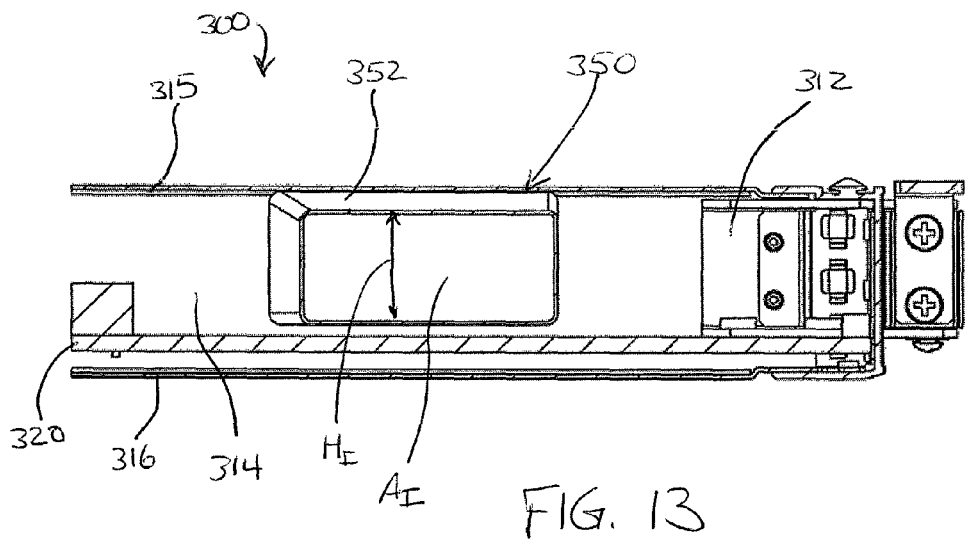
FIG. 13 is a cross-sectional view of the portion of the data processing unit shown in FIGS. 3 and 4, taken along line $X_4$-$X_4$ in FIG. 4.

The inlet portion 352 of the duct defines an opening 351 through which a cooling fluid can flow into the duct 350, as shown by the arrow II in FIGS. 7 and 8. The size of the flow area $A_I$ (see FIG. 13) defined by the inlet portion 352 decreases in the direction of the flow (as indicated by the arrow II). Similarly stated the inlet portion 352 is tapered such that, as shown in FIG. 8, the height $H_I$ of the inlet portion 352 decreases in the direction of the flow. Although the flow area $A_I$ is shown as having a substantially rectangular shape, in other embodiments, the inlet portion 352 can have any suitable cross-sectional shape (e.g., circular, oval or the like)

Figure 9:
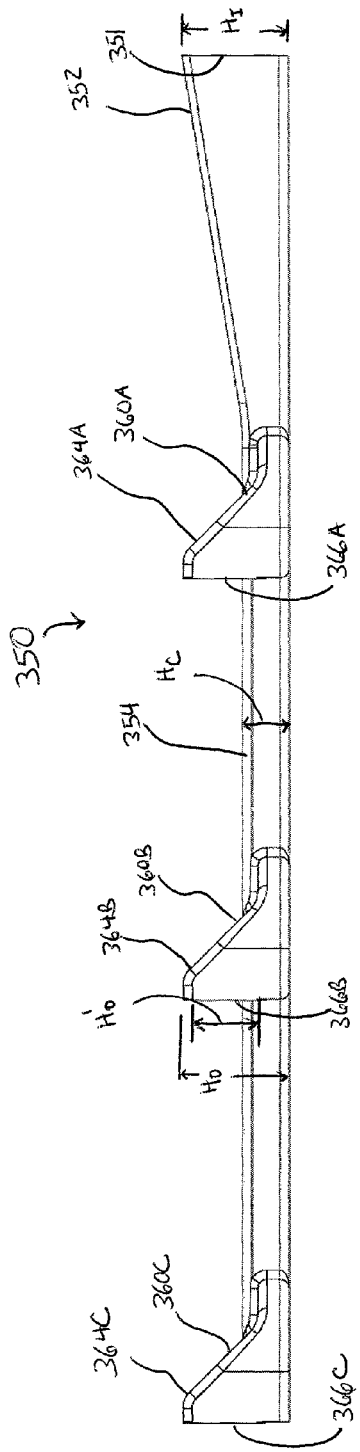
Figure 10:
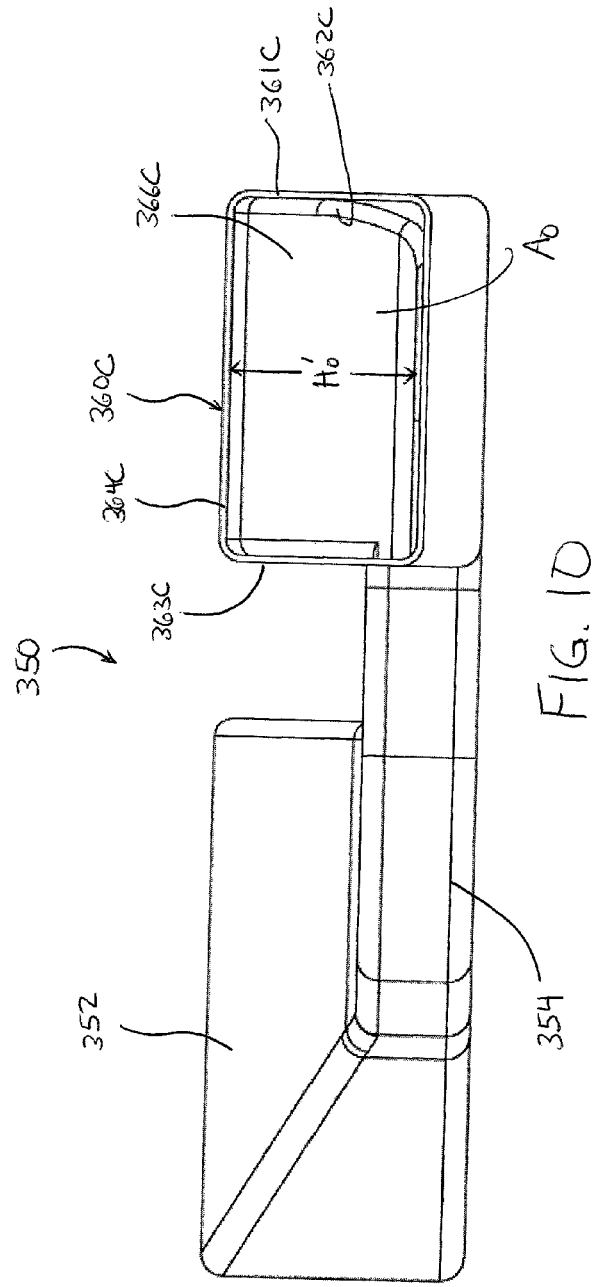
Figure 11:
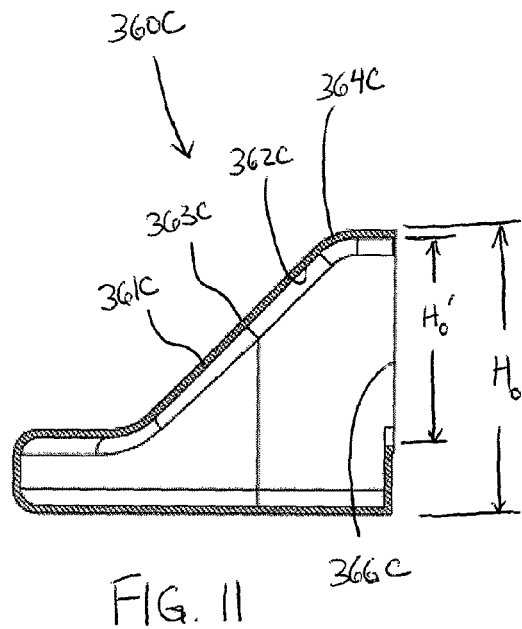
FIG. 11 is a cross-sectional view of the duct shown in FIGS. 3 and 4, taken along line $X_1$-$X_1$ in FIG. 8.
Figure 12:
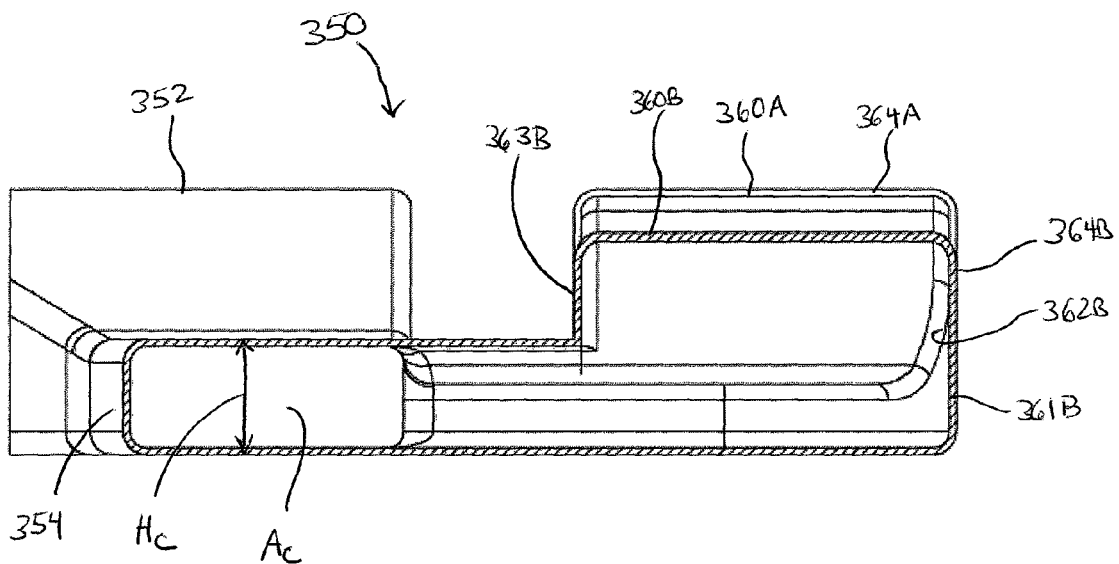
FIG. 12 is a cross-sectional view of the duct shown in FIGS. 3 and 4, taken along line $X_2$-$X_2$ in FIG. 8.
Figure 14:
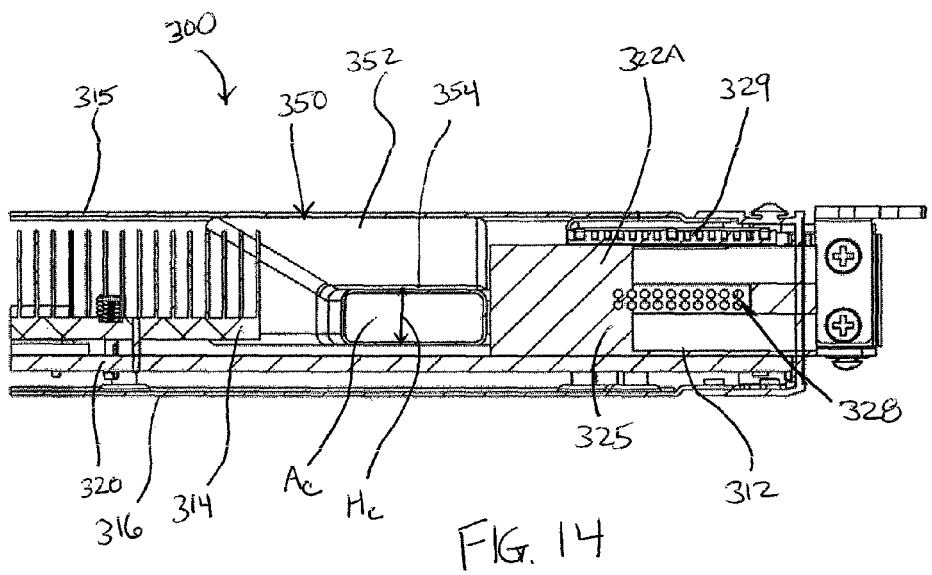
FIG. 14 is a cross-sectional view of the portion of the data processing unit shown in FIGS. 3 and 4, taken along line $X_5$-$X_5$ in FIG. 4.
Figure 15:
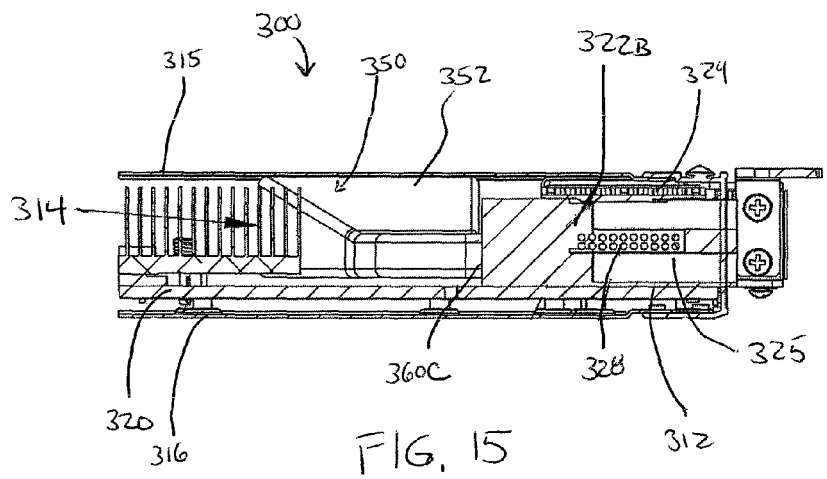
FIG. 15 is a cross-sectional view of the portion of the data processing unit shown in FIGS. 3 and 4, taken along line $X_6$-$X_6$ in FIG. 4.

The central portion 354 of the duct 350 is disposed between and in fluid communication with the inlet portion 352 and the three outlet portions 360A, 360B, 360C. As shown in FIG. 14, the central portion 354 defines a flow area $A_C$ that is less than the flow area of the opening 351 defined by the opening 351 of the inlet portion 352 and the flow area $A_O$ of the openings (e.g., opening 366B as shown in FIG. 10) of the outlet portions 360A, 360B, 360C. Similarly stated, as shown in FIG. 9, a height $H_C$ of the central portion 354 is less than a height $H_I$ of the inlet portion 352 and/or a height $H_O$ of the outlet portions 360A, 360B, 360C. More particularly, the height $H_C$ of the central portion 354 is less than the distance between the surface of the printed circuit board 320 and the top cover 315. In this manner, as described in more detail below, the volume between the top cover 315 and the central portion 354 of the duct 350 can be within a portion of a flow path. In particular, as shown in FIG. 7, the top cover 315 (not shown in FIG. 7) and the central portion 354 of the duct 350 can collectively define, at least in part, the exhaust portion 346 of the first flow path 341 and/or the exhaust portion 348 of the second flow path 342.

The outlet portions 360A, 360B, 360C of the duct 350 are substantially similar, therefore where a description for a particular outlet portion (e.g., outlet portion 360B) is provided below, that description can also apply to the other outlet portions. In other embodiments, however, a duct can include multiple outlet portions having different characteristics (e.g., shape, size or the like) and/or performance (e.g., flow performance).

Referring to FIGS. 7-12, each outlet portion 360A, 360B, 360C of the duct 350 includes a shroud 364A, 364B, 364C (also referred to as a hood or hooded portion) having a height $H_O$ (as identified for the shroud 364B in FIG. 9). Each shroud 364A, 364B, 364C defines an opening 366A, 366B, 366C having a height $H'_O$ and defining a flow area $A_O$ (as identified for the opening 366C in FIG. 10). The outlet portions 360A, 360B, 360C of the duct 350 each include a side wall 361A, 361B, 361C having an interior (or inner) surface 362A, 362B, 362C and an exterior (or outer) surface 363A, 363B, 363C.

As described above, the interior surface 362A defines, at least in part, the inlet portion 345 of the first flow path 342. The interior surface 362B defines, at least in part, the inlet portion 347 of the second flow path 342. The interior surface 362C defines, at least in part, a portion of the third flow path 343. The exterior surface 363B defines, at least in part, the exhaust portion 346 of the first flow path 341. Moreover, the top cover 315 and the central portion 354 of the duct 350 also collectively define, at least in part, the exhaust portion 346 of the first flow path 341. The exterior surface 363C defines, at least in part, the exhaust portion 348 of the second flow path 342. Moreover, the top cover 315 and the central portion 354 of the duct 350 also collectively define, at least in part, the exhaust portion 348 of the second flow path 342.

The duct 350 is coupled to the printed circuit board 320 such that the optical transceiver assembly 322A is disposed between the outlet portion 360A and the outlet portion 360B, and the optical transceiver assembly 322B is disposed between the outlet portion 360B and the outlet portion 360C. Moreover, the duct 350 is coupled to the printed circuit board 320 such that the opening 366A faces toward and/or is substantially aligned with the optical transceiver assembly 322A, the opening 366B faces toward and/or is substantially aligned with the optical transceiver assembly 322B, and the opening 366C faces toward and/or is substantially aligned with the optical transceiver assembly 322C. More particularly, the opening 366A disposed adjacent the side wall 326 of the mounting cage 325 such that the portion of the cooling fluid that exits the opening 366A (as shown by the arrow JJ in FIGS. 7 and 8) flows laterally through both the bottom portion of the interior volume 327 of the mounting cage 325 (as shown by the arrow GG in FIG. 6) and across, adjacent and/or through the heat sinks 329 extending from the top of the mounting cage 325 (as shown by the arrow HH in FIG. 6).

The duct 350 is coupled to the printed circuit board 320 such that, in use, a first portion of the cooling fluid flows within the inlet portion 345 of the first flow path 341 between the inlet portion 352 of the duct 350 and the optical transceiver assembly 322A, as shown by the arrow JJ in FIGS. 7 and 8. Said another way, the duct 350 is coupled to the printed circuit board 320 such that the first portion of the cooling fluid flows within the first flow path 341 between the inlet portion 352 of the duct 350 and the volume 312 defined by the data processing unit 300 that includes the optical transceiver assembly 322A. The first portion of the cooling fluid is then split into a portion that flows laterally through the bottom portion of the interior volume 327 of the mounting cage 325 and a portion that flows across, adjacent and/or over the heat sinks 329 extending from the top of the mounting cage 325 as described above with reference to FIG. 6. Similarly stated, at least a portion of the optical transceiver assembly 322A is disposed within the first flow path 341 such that the first portion of the cooling fluid flows from the outlet portion 360A and through and/or across the optical transceiver assembly 322A.

The first portion of the cooling fluid then flows from the optical transceiver assembly 322A to the volume 314 within the data processing unit 300 that is apart from the optical transceiver assembly 322A, as shown by the arrow KK in FIGS. 7 and 8. Similarly stated, the first portion of the cooling fluid then flows within the exhaust portion 346 of the first flow path 341 to the volume 314. More particularly, the exterior surface 363B of the outlet portion 360B is configured to redirect the first portion of the cooling fluid to the volume 314. Similarly stated, the exterior surface 363B of the outlet portion 360B has a shape and/or orientation configured to change the flow direction of the first portion of the cooling fluid as it exits the optical transceiver assembly 322A. In this manner, the exterior surface 363B of the outlet portion 360B redirects the exhaust flow from the optical transceiver assembly 322A away from the optical transceiver assembly 322B. This arrangement prevents the first portion of the cooling fluid, after having been heated by the optical transceiver assembly 322A, from mixing with a second portion of the cooling fluid used to cool the optical transceiver assembly 322B. This arrangement allows the cooling fluid to be conveyed to the optical transceiver assemblies 322A and 322B in parallel.

The duct 350 is coupled to the printed circuit board 320 such that, in use, the second portion of the cooling fluid flows within the inlet portion 347 of the second flow path 341 between the inlet portion 352 of the duct 350 and the optical transceiver assembly 322B, as shown by the arrow LL in FIGS. 7 and 8. Said another way, the duct 350 is coupled to the printed circuit board 320 such that the second portion of the cooling fluid flows within the second flow path 342 between the inlet portion 352 of the duct 350 and the volume 312 defined by the data processing unit 300 that includes the optical transceiver assembly 322B. The second portion of the cooling fluid is then split into a portion that flows laterally through the bottom portion of the interior volume 327 of the mounting cage 325 and a portion that flows across, adjacent and/or over the heat sinks 329 extending from the top of the mounting cage 325 (of the optical transceiver assembly 322B) as described above with reference to FIG. 6. Similarly stated, at least a portion of the optical transceiver assembly 322B is disposed within the second flow path 342 such that the second portion of the cooling fluid flows from the outlet portion 360B and through and/or across the optical transceiver assembly 322B. In some embodiments, the second portion of the cooling fluid can have a flow direction when exiting the opening 366B that is substantially coaxial to a flow direction of the first portion of the cooling fluid when the first portion of the cooling fluid exits the opening 366A. Similarly stated, in some embodiments, the opening 366B can define a centroidal axis that is substantially coaxial to a centroidal axis of the opening 366A.

The second portion of the cooling fluid then flows from the optical transceiver assembly 322B to the volume 314 within the data processing unit 300 that is apart from the optical transceiver assembly 322B, as shown by the arrow MM in FIGS. 7 and 8. Similarly stated, the second portion of the cooling fluid then flows within the exhaust portion 348 of the second flow path 342 to the volume 314. More particularly, the exterior surface 363C of the outlet portion 360C is configured to redirect the second portion of the cooling fluid to the volume 314. Similarly stated, the exterior surface 363C of the outlet portion 360C has a shape and/or orientation configured to change the flow direction of the second portion of the cooling fluid as it exits the optical transceiver assembly 322B. In this manner, the exterior surface 363C of the outlet portion 360C redirects the exhaust flow from the optical transceiver assembly 322B away from the optical transceiver assembly 322C. This arrangement prevents the second portion of the cooling fluid, after having been heated by the optical transceiver assembly 322B, from mixing with a third portion of the cooling fluid used to cool the optical transceiver assembly 322C. This arrangement allows the cooling fluid to be conveyed to the optical transceiver assemblies 322B and 322C in parallel.

The duct 350 is coupled to the printed circuit board 320 such that, in use, the third portion of the cooling fluid flows within the third flow path 343 between the inlet portion 352 of the duct 350 and the optical transceiver assembly 322C, as shown by the arrow NN in FIGS. 7 and 8. Said another way, the duct 350 is coupled to the printed circuit board 320 such that the third portion of the cooling fluid flows within the third flow path 343 between the inlet portion 352 of the duct 350 and the volume 312 defined by the data processing unit 300 that includes the optical transceiver assembly 322C. The third portion of the cooling fluid is then split into a portion that flows laterally through the bottom portion of the interior volume 327 of the mounting cage 325 and a portion that flows across, adjacent and/or over the heat sinks 329 extending from the top of the mounting cage 325 (of the optical transceiver assembly 322C) as described above with reference to FIG. 6. Similarly stated, at least a portion of the optical transceiver assembly 322C is disposed within the third flow path 343 such that the third portion of the cooling fluid flows from the outlet portion 360C and through and/or across the optical transceiver assembly 322C. In some embodiments, the third portion of the cooling fluid can have a flow direction when exiting the opening 366C that is substantially coaxial to a flow direction of the first portion of the cooling fluid when the first portion of the cooling fluid exits the opening 366A and/or a flow direction of the second portion of the cooling fluid when the second portion of the cooling fluid exits the opening 366B. Similarly stated, in some embodiments, the opening 366C can define a centroidal axis that is substantially coaxial to a centroidal axis of the opening 366A and/or a centroidal axis of the opening 366B.

In some embodiments, the duct 350 can be configured such that the first portion of the cooling fluid (e.g., the portion that flows through the outlet portion 360A to cool the optical transceiver assembly 322A), the second portion of the cooling fluid (e.g., the portion that flows through the outlet portion 360B to cool the optical transceiver assembly 322B) and/or the third portion of the cooling fluid (e.g., the portion that flows through the outlet portion 360C to cool the optical transceiver assembly 322C) are substantially equal. Similarly stated, in some embodiments the duct 350 is "balanced" such that, in use, a substantially equal amount of cooling flow is conveyed to each of the optical transceiver assemblies 322A, 322B, 322C. In other embodiments, however, the duct 350 can be balanced such that, in use, the flow rate of the cooling fluid through at least one of the outlet portions (e.g., the outlet portion 360A) is different from the flow rate of the cooling fluid through one of the other outlet portions (e.g., the outlet portion 360B).

The balancing of the flow of cooling fluid within the duct 350 can be accomplished by any suitable mechanism. For example, in some embodiments, a size and/or a flow area of one of the outlet portions can be different from a size and/or a flow area of one of the other outlet portions. For example, in some embodiments, the flow area of the outlet portion 360C, which is furthest from the inlet portion 352 of the duct 350, can be larger than the flow area of the outlet portion 360A, which is closest to the inlet portion 352 of the duct 350. This arrangement can produce a substantially equal flow rate of cooling fluid through the outlet portions 360A and 360C by accommodating for differences in frictional losses resulting from the difference in the length of the first flow path 341 and the third flow path 343. In other embodiments, a duct can include a flow control member (e.g., a valve, a baffle, an orifice or the like) to balance selectively the flow of cooling fluid within the duct.

In some embodiments, at least one of the outlet portions 360A, 360B, 360C can include a flow control member, such as, for example, a baffle, to redirect and/or balance the flow of cooling fluid into and/or around the adjacent optical transceiver assembly. For example, in some embodiments, the outlet portion 360A can include one or more baffles (not shown in FIGS. 7-12) coupled to the interior surface 362A adjacent the opening 366C. The baffle or baffles can have a shape and/or orientation to subdivide the first portion of the cooling fluid into a portion that flows through the bottom portion of the interior volume 327 of the mounting cage 325 via the openings 328 (as shown by the arrow GG in FIG. 6) and a portion that flows across the top portion of the mounting cage 325 (as shown by the arrow HH in FIG. 6). In some embodiments, for example, the outlet portion 360A can include a baffle or baffles having a shape and/or orientation such that the flow through the openings 328 is different than the flow across the top of the mounting cage 325.

The ducts shown and described herein, such as, for example, the duct 350 can be constructed from any suitable material. Such materials can include, metal, plastic and/or composite materials. In some embodiments, a duct of the types shown and described herein can be constructed from more than one material. For example, in some embodiments, a duct can include a metallic substrate and/or structural layer material and an thermally insulative layer (e.g., constructed from fiberglass, a foam polymer or the like). Moreover, any of the ducts shown and described herein can be monolithically constructed or constructed from multiple components that are later joined together.

The data processing units are shown and described above as including one or more sources of cooling fluid. Such sources of cooling fluid can be any suitable source of cooling fluid, such as, for example, a fan tray, a compressed gas tank, a plenum containing pressurized air or the like. In some embodiments, for example, the source of cooling fluid can include a propeller fan, a tubeaxial fan and/or a vaneaxial fan for producing a pressurized air flow through the data processing unit. For example, in some embodiments, a source of cooling fluid can be a fan can be any suitable tubeaxial fan produced by Delta Electronics, Inc. (e.g., the QFR 60×60×38 Series tubeaxial fan), EBM-Papst, Inc. (e.g., the 3000 Series tubeaxial fan) and the Nidec Servo Corporation (e.g., the PUDC series tubeaxial fan).

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, although air is the cooling medium described herein (e.g., the flow paths are often referred to as "air" flow paths), in other embodiments, any suitable gas can be used as the cooling medium. For example, in some embodiments, the cooing medium can be nitrogen.

Although the ducts shown and described herein (e.g., duct 350) have been shown as being a fully enclosed structure having at least one inlet opening (e.g., opening 351) and at least one outlet opening (e.g., opening 366A), and defining at least one flow path (e.g., flow path 341) therein, in other embodiments, a duct can be any structure that can define a flow path, flow conduit, flow channel and/or that can redirect an air flow as described herein. For example, in some embodiments, a duct can include a structure that is not fully enclosed. For example, in some embodiments, a duct can be a structure similar to the duct 350, but having an open bottom portion. Accordingly, when the duct is coupled to a printed circuit board, the side wall of the duct and the surface of the printed circuit board collectively define at least a portion of a flow path, flow conduit and/or flow channel. In other embodiments, a duct can include one or more baffles or other flow structures coupled to a printed circuit board that collectively define a flow path and/or redirect a flow of cooling fluid (e.g. similar to a series of stator blades)

Although the duct 350 is shown as having one inlet portion 352 and three outlet portions 360A, 360B and 360C, in other embodiments, a duct can have any number of inlet portions and any number of outlet portions. For example, in some embodiments, a duct can include two inlet portions and four outlet portions. In some such embodiments, one of the inlet portions can be in fluid communication with two of the outlet portions, and the other inlet portion can be in fluid communication with the other two outlet portions.

Although the duct 350 is shown and described above as including three substantially similar outlet portions 360A, 360B, 360C, in other embodiments, a duct can include any number of outlet portions, where at least one of the outlet portions differs in size, shape and/or function from at least one of the other outlet portions.

Although various embodiments have been described as having particular features and/or combinations of components, other embodiments are possible having a combination of any features and/or components from any of embodiments as discussed above. For example, in some embodiments, a data processing unit can include a duct similar to the duct 350 (shown and described with reference to FIGS. 7-12) and a baffle similar to the baffle 280 (shown and described with reference to FIG. 2).

What is claimed is:

1. An apparatus, comprising:
   a duct including an inlet portion and an outlet portion,
   an interior surface of the outlet portion of the duct defining, at least in part, a portion of a first flow path, the duct configured to be coupled to a printed circuit board within a data processing unit such that a first portion of a cooling fluid can flow within the first flow path from the inlet portion of the duct to first electronic device coupled to the printed circuit board,
   an exterior surface of the outlet portion of the duct defining, at least in part, a portion of a second flow path, the exterior surface configured to receive a second portion of the cooling fluid from a second electronic device and redirect the second portion of the cooling fluid to a volume within the data processing unit apart from the first electronic device.

2. The apparatus of claim 1, wherein:
   the outlet portion is a first outlet portion;
   the portion of the second flow path is a first portion of the second flow path; and
   the duct includes a second outlet portion, an interior surface of the second outlet portion of the duct defining, at least in part, a second portion of the second flow path, the duct configured to be coupled to the printed circuit board such that the second electronic device is within the second flow path.

3. The apparatus of claim 1, wherein a size of a portion of the first flow path within the outlet portion is greater than a size of the inlet portion of the duct.

4. The apparatus of claim 1, wherein a flow area of the first flow path within the outlet portion is greater than a flow area of the inlet portion of the duct.

5. The apparatus of claim 1, wherein:
   the first electronic device is an optical transceiver disposed within a cage configured to contain a plurality of optical transceivers in a stacked configuration; and
   the outlet portion of the duct defines an opening that is configured to be substantially aligned with an opening defined by the cage.

6. The apparatus of claim 1, wherein the duct is configured to be coupled to the printed circuit board such that a portion of the printed circuit board defines, at least in part, at least one of the portion of the first flow path or the portion of the second flow path.

7. The apparatus of claim 1, wherein the first electronic device is within the first flow path.

8. An apparatus, comprising:
   a duct including an inlet portion, a first outlet portion and a second outlet portion, the first outlet portion defining, at least in part, a portion of a first flow path, an exterior surface of the second outlet portion of the duct defining, at least in part, a portion of the first flow path, an interior surface of the second outlet portion of the duct defining, at least in part, a portion of a second flow path,
   the duct configured to be coupled to a printed circuit board such that a first electronic device coupled to the printed circuit board is within the first flow path and a second electronic device coupled to the printed circuit board is within the second flow path, the duct configured such that a first portion of a cooling fluid can flow within the first flow path between the first electronic device and a volume within the data processing unit apart from the second electronic device, the duct configured such that a second portion of the cooling fluid can flow within the second flow path between the inlet portion of the duct and the second electronic device.

9. The apparatus of claim 8, wherein a flow area of a portion of the second flow path within the second outlet portion is greater than a flow area of a central portion of the duct, the central portion of the duct disposed between the inlet portion and the second outlet portion.

10. The apparatus of claim 8, wherein:
    the second electronic device is an optical transceiver disposed within a cage configured to contain a plurality of optical transceivers in a stacked configuration; and
    the second outlet portion of the duct defines an opening that is configured to be substantially aligned with an opening defined by the cage.

11. The apparatus of claim 8, wherein the first electronic device is disposed between the first outlet portion and second outlet portion.

12. The apparatus of claim 8, wherein:
    the second electronic device is an optical transceiver disposed within a cage configured to contain a plurality of optical transceivers in a stacked configuration; and
    the second outlet portion of the duct includes a shroud defining an opening facing a side wall of the cage, the shroud having a height greater than a height of a central portion of the duct, the central portion of the duct disposed between the inlet portion and the second outlet portion.

13. The apparatus of claim 8, wherein:
the second electronic device is a first optical transceiver disposed within a cage configured to contain a plurality of optical transceivers such that the first optical transceiver is disposed between a second optical transceiver from the plurality of optical transceivers and the printed circuit board; and
the second outlet portion of the duct includes a baffle such that the second portion of the cooling fluid can flow within the second flow path from the inlet portion of the duct substantially in parallel to the first optical transceiver and the second optical transceiver.

14. The apparatus of claim 8, wherein:
the exterior surface of the second outlet portion of the duct is configured to redirect the first portion of the cooling fluid within the first flow path to the volume within the data processing unit apart from the second electronic device.

15. The apparatus of claim 8, further comprising:
a cover configured to enclose at least a portion of the printed circuit board, a portion of the cover defining, at least in part, the portion of the second flow path.

16. The apparatus of claim 8, wherein the inlet portion of the duct includes a flow control member configured to adjust the magnitude of the first portion of the cooling fluid relative to a magnitude of the second portion of the cooling fluid.

17. An apparatus, comprising:
a duct defining, at least in part, a portion of a first inlet flow path, a portion of a second inlet flow path, a portion of a third inlet flow path, a portion of a first exhaust flow path, and a portion of second exhaust flow path,
the duct configured to be coupled to a printed circuit board within a data processing unit such that a first portion of a cooling fluid can flow within the first inlet flow path from a source of cooling fluid to a first electronic device, a second portion of the cooling fluid can flow within the second inlet flow path from the source of cooling fluid to a second electronic device, and a third portion of the cooling fluid can flow within the third inlet flow path from the source of cooling fluid to a third electronic device,
the first portion of the cooling fluid can flow within the first exhaust flow path from the first electronic device to a volume within the data processing unit apart from the second electronic device and the second portion of the cooling fluid can flow within the second exhaust flow path from the second electronic device to a volume within the data processing unit apart from the third electronic device.

18. The apparatus of claim 17, wherein:
the duct includes a side wall, a first surface of the side wall defines, at least in part, the portion of the second inlet flow path, a second surface of the side wall defines, at least in part, the portion of the first exhaust flow path.

19. The apparatus of claim 17, wherein:
at least one of the first electronic device or the second electronic device is an optical transceiver disposed within a cage configured to contain a plurality of optical transceivers in a stacked configuration; and
the duct includes a shroud defining an opening that faces towards a side wall of the cage, an exterior surface of the shroud defining, at least in part, at least one of the portion of the first exhaust flow path or the portion of the second exhaust flow path, an interior surface of the shroud defining, at least in part, at least one of the portion of the second inlet flow path or the portion of the third inlet flow path.

20. The apparatus of claim 17, wherein:
the duct defines a first opening through which the first portion of the cooling fluid flows when the first portion of the cooling exits the first inlet flow path, the first opening defining a first flow axis; and
the duct defines a second opening through which the second portion of the cooling fluid flows when the second portion of the cooling exits the second inlet flow path, the second opening defining a second flow axis substantially coaxial to the first flow axis.

* * * * *

UNITED STATES PATENT AND TRADEMARK OFFICE
CERTIFICATE OF CORRECTION

PATENT NO. : 8,279,601 B2  
APPLICATION NO. : 12/695509  
DATED : October 2, 2012  
INVENTOR(S) : Lima et al.

It is certified that error appears in the above-identified patent and that said Letters Patent is hereby corrected as shown below:

Claims

Column 13, line 52 (claim 1, line 8):

"duct to first electronic device" should read "duct to a first electronic device"

Column 15, line 34 (claim 17, line 5):

"and a portion of second exhaust flow path," should read "and a portion of a second exhaust flow path,"

Signed and Sealed this  
Eighth Day of March, 2016

Michelle K. Lee  
*Director of the United States Patent and Trademark Office*